(12) United States Patent
    Barron-Kraus et al.

(10) Patent No.: US 12,563,115 B2
(45) Date of Patent: Feb. 24, 2026

(54) DATABASE OFFLOAD WITH NODE-TO-NODE COMMUNICATION

(71) Applicant: ServiceNow, Inc., Santa Clara, CA (US)

(72) Inventors: Kyle Barron-Kraus, East Lansing, MI (US); Benedetto Fiorelli, Milan (IT); Vinamra Misra, Hyderabad (IN); Shasank Maturi, Hyderabad (IN); Kavish Jain, Santa Clara, CA (US); André Michel Milton, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 43 days.

(21) Appl. No.: 18/749,340

(22) Filed: Jun. 20, 2024

(65) Prior Publication Data

US 2025/0392640 A1     Dec. 25, 2025

(51) Int. Cl.
    *H04L 67/1097*     (2022.01)
    *G06F 16/27*      (2019.01)

(52) U.S. Cl.
    CPC .......... *H04L 67/1097* (2013.01); *G06F 16/27* (2019.01)

(58) Field of Classification Search
    None
    See application file for complete search history.

(56) References Cited

U.S. PATENT DOCUMENTS

| | | | |
|---|---|---|---|
| 4,941,084 A | 7/1990 | Terada | |
| 5,185,860 A | 2/1993 | Wu | |
| 5,237,518 A | 8/1993 | Sztipanovits | |
| 5,261,097 A | 11/1993 | Saxon | |
| 5,265,252 A | 11/1993 | Rawson, III | |
| 5,367,685 A | 11/1994 | Gosling | |
| 5,390,297 A | 2/1995 | Barber | |
| 5,442,791 A | 8/1995 | Wrabetz | |
| 5,452,415 A | 9/1995 | Hotka | |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

Reynaud et al., "CedCom: A high-performance architecture for Big Data applications", Nov. 1, 2014, IEEE, 2014 IEEE/ACS 11th International Conference on Computer Systems and Applications (AICCSA) (2014, pp. 621-632) (Year: 2014).*

(Continued)

*Primary Examiner* — Davoud A Zand
(74) *Attorney, Agent, or Firm* — McDonnell Boehnen Hulbert & Berghoff LLP

(57)     ABSTRACT

An example embodiment may involve conducting, by an application node, an operation with a database node, wherein the application node and the database node are both within a computational instance of nodes; transmitting, by the application node and to each of a plurality of destination application nodes, a message relating to the operation, wherein the plurality of destination application nodes are also within the computational instance of nodes; and updating, by each of the plurality of destination application nodes, respective local storage of data relating to the operation.

20 Claims, 11 Drawing Sheets

(56)                References Cited

U.S. PATENT DOCUMENTS

| | | | |
|---|---|---|---|
| 5,522,042 A | 5/1996 | Fee | |
| 5,533,116 A | 7/1996 | Vesterinen | |
| 5,655,081 A | 8/1997 | Bonnell | |
| 5,659,736 A | 8/1997 | Hasegawa | |
| 5,671,412 A | 9/1997 | Christiano | |
| 5,696,701 A | 12/1997 | Burgess | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke | |
| 5,887,139 A | 3/1999 | Madison, Jr. | |
| 5,909,217 A | 6/1999 | Bereiter | |
| 5,937,165 A | 8/1999 | Schwaller | |
| 5,949,976 A | 9/1999 | Chappelle | |
| 5,978,594 A | 11/1999 | Bonnell | |
| 6,021,437 A | 2/2000 | Chen | |
| 6,041,347 A | 3/2000 | Harsham | |
| 6,088,717 A | 7/2000 | Reed | |
| 6,101,500 A | 8/2000 | Lau | |
| 6,128,016 A | 10/2000 | Coelho | |
| 6,131,118 A | 10/2000 | Stupek, Jr. | |
| 6,134,581 A | 10/2000 | Ismael | |
| 6,138,122 A | 10/2000 | Smith | |
| 6,148,335 A | 11/2000 | Haggard | |
| 6,166,732 A | 12/2000 | Mitchell | |
| 6,167,448 A | 12/2000 | Hemphill | |
| 6,175,866 B1 | 1/2001 | Holloway | |
| 6,175,878 B1 | 1/2001 | Seaman | |
| 6,260,050 B1 | 7/2001 | Yost | |
| 6,263,457 B1 | 7/2001 | Anderson | |
| 6,272,150 B1 | 8/2001 | Hrastar | |
| 6,336,138 B1 | 1/2002 | Caswell | |
| 6,363,421 B2 | 3/2002 | Barker | |
| 6,393,386 B1 | 5/2002 | Zager | |
| 6,397,245 B1 | 5/2002 | Johnson, II | |
| 6,434,626 B1 | 8/2002 | Prakash | |
| 6,438,592 B1 | 8/2002 | Killian | |
| 6,456,306 B1 | 9/2002 | Chin | |
| 6,466,932 B1 | 10/2002 | Dennis | |
| 6,487,590 B1 | 11/2002 | Foley | |
| 6,505,248 B1 | 1/2003 | Casper | |
| 6,526,442 B1 | 2/2003 | Stupek, Jr. | |
| 6,621,823 B1 | 9/2003 | Mellquist | |
| 6,707,795 B1 | 3/2004 | Noorhosseini | |
| 6,742,015 B1 | 5/2004 | Bowman-Amuah | |
| 6,763,380 B1 | 7/2004 | Mayton | |
| 6,816,898 B1 | 11/2004 | Joe | |
| 6,895,586 B1 | 5/2005 | Brasher | |
| 6,948,175 B1 | 9/2005 | Fong | |
| 6,985,901 B1 | 1/2006 | Sachse | |
| 7,003,564 B2 | 2/2006 | Greuel | |
| 7,028,228 B1 | 4/2006 | Lovy | |
| 7,043,537 B1 | 5/2006 | Pratt | |
| 7,043,661 B2 | 5/2006 | Valadarsky | |
| 7,062,683 B2 | 6/2006 | Warpenburg | |
| 7,096,459 B2 | 8/2006 | Keller | |
| 7,146,574 B2 | 12/2006 | Goldthwaite | |
| 7,197,466 B1 | 3/2007 | Peterson | |
| 7,215,360 B2 | 5/2007 | Gupta | |
| 7,216,304 B1 | 5/2007 | Gourdol | |
| 7,222,147 B1 | 5/2007 | Black | |
| 7,281,170 B2 | 10/2007 | Taylor | |
| 7,328,260 B1 | 2/2008 | Muthiyan | |
| 7,412,502 B2 | 8/2008 | Fearn | |
| 7,505,872 B2 | 3/2009 | Keller | |
| 7,593,013 B2 | 9/2009 | Agutter | |
| 7,596,716 B2 | 9/2009 | Frost | |
| 7,617,073 B2 | 11/2009 | Trinon | |
| 7,660,731 B2 | 2/2010 | Chaddha | |
| 7,676,294 B2 | 3/2010 | Baier | |
| 7,676,437 B2 | 3/2010 | Satkunanathan | |
| 7,840,490 B1 | 11/2010 | Sellers | |
| 7,877,783 B1 | 1/2011 | Cline | |
| 7,890,869 B1 | 2/2011 | Mayer | |
| 7,966,398 B2 | 6/2011 | Wiles, Jr. | |
| 8,060,396 B1 | 11/2011 | Bessler | |
| 8,196,210 B2 | 6/2012 | Sterin | |
| 8,321,948 B2 | 11/2012 | Robinson | |
| 8,407,669 B2 | 3/2013 | Yee | |
| 8,554,750 B2 | 10/2013 | Rangarajan | |
| 8,595,647 B2 | 11/2013 | Sabin | |
| 8,620,818 B2 | 12/2013 | Hughes | |
| 8,646,093 B2 | 2/2014 | Myers | |
| 8,674,992 B2 | 3/2014 | Poston | |
| 8,693,367 B2 | 4/2014 | Chowdhury | |
| 8,725,647 B2 | 5/2014 | Disciascio | |
| 9,053,460 B2 | 6/2015 | Gilbert | |
| 9,069,737 B1 | 6/2015 | Kimotho | |
| 9,639,589 B1 * | 5/2017 | Theimer | G06F 11/1461 |
| 9,678,968 B1 | 6/2017 | Taylor | |
| 9,971,826 B1 | 5/2018 | Belmar | |
| 10,585,887 B2 | 3/2020 | Tran | |
| 10,673,963 B1 | 6/2020 | Feiguine | |
| 10,749,943 B1 | 8/2020 | Feiguine | |
| 10,771,344 B2 | 9/2020 | Bitterfeld | |
| 10,824,650 B2 | 11/2020 | Bar Oz | |
| 10,944,654 B2 | 3/2021 | Rimar | |
| 10,999,152 B1 | 5/2021 | Bar Oz | |
| 11,025,481 B1 | 6/2021 | Louca | |
| 11,061,735 B2 | 7/2021 | Li | |
| 11,089,115 B2 | 8/2021 | Garty | |
| 11,095,506 B1 | 8/2021 | Erblat | |
| 11,275,580 B2 | 3/2022 | Tamir | |
| 11,277,475 B1 | 3/2022 | Tal | |
| 11,281,442 B1 | 3/2022 | Tal | |
| 11,294,666 B1 | 4/2022 | Look | |
| 11,296,922 B2 | 4/2022 | Leibkowiz | |
| 11,301,503 B2 | 4/2022 | Burli | |
| 11,379,089 B2 | 7/2022 | Goswami | |
| 11,451,573 B2 | 9/2022 | Waplington | |
| 11,468,060 B2 | 10/2022 | Sonawane | |
| 11,470,107 B2 | 10/2022 | Waplington | |
| 11,582,106 B2 | 2/2023 | Hameiri | |
| 11,616,690 B2 | 3/2023 | Feiguine | |
| 11,630,717 B2 | 4/2023 | Vutukuru | |
| 11,632,303 B2 | 4/2023 | Bitterfeld | |
| 11,640,369 B2 | 5/2023 | Bhogle | |
| 11,671,444 B2 | 6/2023 | Waplington | |
| 11,695,641 B2 | 7/2023 | Bar Oz | |
| 11,829,233 B2 | 11/2023 | Watkins | |
| 11,868,593 B2 | 1/2024 | Bradley | |
| 2002/0116340 A1 | 8/2002 | Hellberg | |
| 2002/0133584 A1 | 9/2002 | Greuel | |
| 2002/0158969 A1 | 10/2002 | Gupta | |
| 2003/0118087 A1 | 6/2003 | Goldthwaite | |
| 2003/0200293 A1 | 10/2003 | Fearn | |
| 2005/0015217 A1 | 1/2005 | Weidl | |
| 2005/0091356 A1 | 4/2005 | Izzo | |
| 2006/0026453 A1 | 2/2006 | Frost | |
| 2006/0095461 A1 | 5/2006 | Raymond | |
| 2006/0179058 A1 | 8/2006 | Bram | |
| 2006/0288053 A1 | 12/2006 | Holt | |
| 2006/0293942 A1 | 12/2006 | Chaddha | |
| 2007/0033279 A1 | 2/2007 | Battat | |
| 2007/0188494 A1 | 8/2007 | Agutter | |
| 2007/0288389 A1 | 12/2007 | Vaughan | |
| 2008/0133289 A1 | 6/2008 | Armour | |
| 2008/0148253 A1 | 6/2008 | Badwe | |
| 2008/0319779 A1 | 12/2008 | Hughes | |
| 2009/0088875 A1 | 4/2009 | Baier | |
| 2009/0228984 A1 | 9/2009 | Sterin | |
| 2010/0110932 A1 | 5/2010 | Doran | |
| 2013/0283273 A1 | 10/2013 | Miyazaki | |
| 2014/0012936 A1 * | 1/2014 | Aikoh | G06F 12/084 709/213 |
| 2014/0122427 A1 | 5/2014 | Dary | |
| 2016/0070740 A1 * | 3/2016 | Vermeulen | G06F 16/273 707/703 |
| 2016/0188218 A1 * | 6/2016 | Gray | G06F 11/20 711/165 |
| 2016/0350385 A1 | 12/2016 | Poder | |
| 2017/0109199 A1 | 4/2017 | Chen | |
| 2018/0123940 A1 | 5/2018 | Rimar | |
| 2019/0073257 A1 | 3/2019 | Dasgupta | |

(56)        References Cited

U.S. PATENT DOCUMENTS

| | | |
|---|---|---|
| 2019/0104398 A1 | 4/2019 | Owen |
| 2019/0129739 A1 | 5/2019 | Al Reza |
| 2019/0149515 A1 | 5/2019 | Sharma |
| 2019/0165957 A1 | 5/2019 | Abbott |
| 2019/0342162 A1 | 11/2019 | Bendre |
| 2020/0034462 A1 | 1/2020 | Narayanasamy |
| 2020/0050689 A1 | 2/2020 | Tal |
| 2020/0204443 A1 | 6/2020 | Bar Oz |
| 2020/0301678 A1 | 9/2020 | Burman |
| 2021/0097168 A1 | 4/2021 | Patel |
| 2021/0194764 A1 | 6/2021 | Badyan |
| 2022/0303352 A1 | 9/2022 | Herzog |
| 2023/0229542 A1 | 7/2023 | Watkins |

FOREIGN PATENT DOCUMENTS

| | | | |
|---|---|---|---|
| WO | 9934285 A1 | 7/1999 | |
| WO | 0052559 A1 | 9/2000 | |
| WO | 0179970 A1 | 10/2001 | |

OTHER PUBLICATIONS

International Search Report and Written Opinion, PCT Application PCT/US2025/027312, mailed Aug. 21, 2025.

* cited by examiner

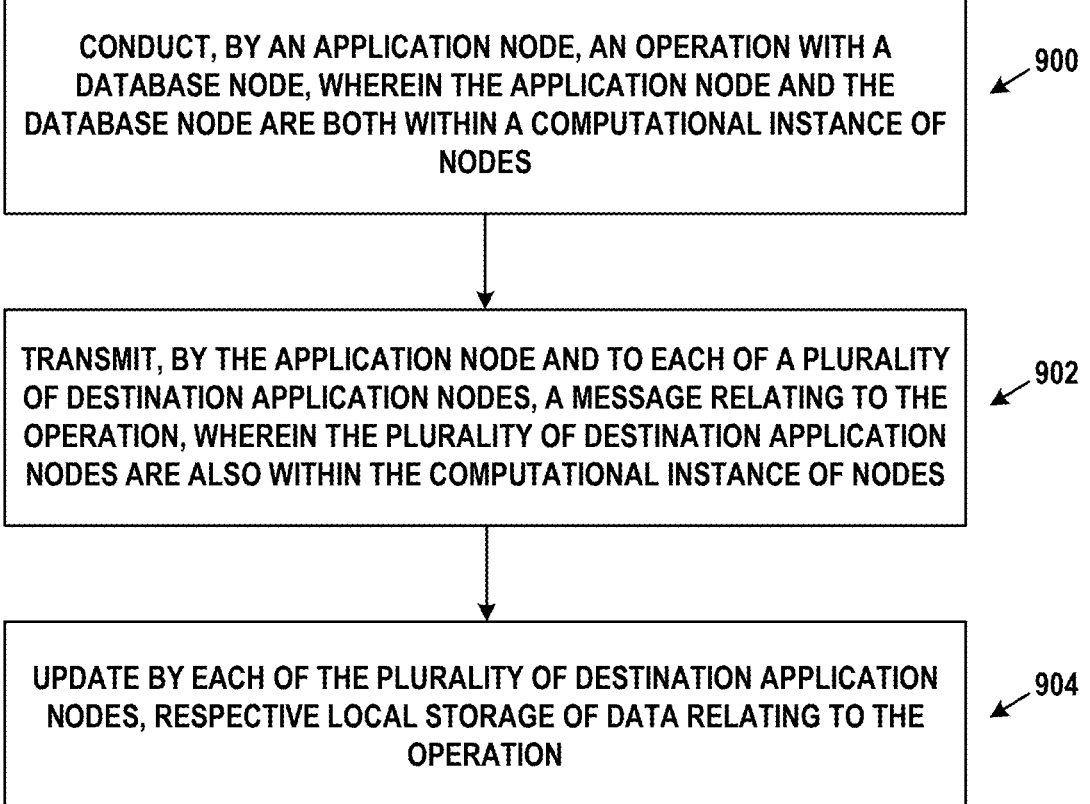

CONDUCT, BY AN APPLICATION NODE, AN OPERATION WITH A DATABASE NODE, WHEREIN THE APPLICATION NODE AND THE DATABASE NODE ARE BOTH WITHIN A COMPUTATIONAL INSTANCE OF NODES — 900

TRANSMIT, BY THE APPLICATION NODE AND TO EACH OF A PLURALITY OF DESTINATION APPLICATION NODES, A MESSAGE RELATING TO THE OPERATION, WHEREIN THE PLURALITY OF DESTINATION APPLICATION NODES ARE ALSO WITHIN THE COMPUTATIONAL INSTANCE OF NODES — 902

UPDATE BY EACH OF THE PLURALITY OF DESTINATION APPLICATION NODES, RESPECTIVE LOCAL STORAGE OF DATA RELATING TO THE OPERATION — 904

FIG. 9

DATABASE OFFLOAD WITH NODE-TO-NODE COMMUNICATION

BACKGROUND

Computing platforms can contain nodes (e.g., computing resources, such as computing devices and/or virtual machines) that serve as database nodes and/or application nodes. The database nodes may contain one or more databases that are defined by respective schemas. The application nodes may be responsible for handling requests, executing application logic, rendering user interfaces, and/or managing interactions with the database nodes. In many cases, there are more application nodes than database nodes and computing platform processing is balanced across these application nodes in some fashion.

Such a computing platform may be database-driven, in that most or all relevant state is maintained in the database nodes while the application nodes maintain little or none of this state. Further, this state may be shared state that is effectively synchronized across application nodes by their using the database nodes as a source of truth. Thus, application nodes may frequently access database nodes when performing application node tasks so that they can obtain the latest version of the share stated. As a consequence, the database nodes can become bottlenecks to overall platform performance.

SUMMARY

Various implementations disclosed herein include techniques for node-to-node communication between application nodes. In particularly, one or more communication channels may be established between application nodes so that shared state can be synchronized between database nodes and also provided to other application nodes. These communication channels may be unicast (point-to-point between two application nodes), and/or multicast/broadcast (point-to-multipoint to groups of the application nodes). Further, communication channels may be half-duplex (e.g., one-way) or full-duplex (e.g., two-way).

One possible use case for this node-to-node communication is cache replication across application nodes. Application nodes may maintain caches of data that they read from the database nodes. If one node reads from a particular database table, that information is likely going to be requested by some or all of the other application nodes. Accordingly, the application node that reads the information may proactively share it with the other application nodes so that they can avoid having to query it from the database. There may be many additional use cases.

These embodiments reduce the volume of queries to the database nodes. As a consequence, database nodes have faster response times and higher reliability, and fewer database nodes are needed as the number of application nodes is scaled up. Also, since each query is computationally expensive for a database node to serve while the node-to-node communication is comparatively inexpensive, these embodiments dramatically reduce the overall load on nodes within the platform.

Accordingly, a first example embodiment may involve conducting, by an application node, an operation with a database node, wherein the application node and the database node are both within a computational instance of nodes; transmitting, by the application node and to each of a plurality of destination application nodes, a message relating to the operation, wherein the plurality of destination application nodes are also within the computational instance of nodes; and updating, by each of the plurality of destination application nodes, respective local storage of data relating to the operation.

A second example embodiment may involve a non-transitory computer-readable medium, having stored thereon program instructions that, upon execution by a computing system, cause the computing system to perform operations in accordance with any of the previous example embodiments.

In a third example embodiment, a computing system may include at least one processor, as well as memory and program instructions. The program instructions may be stored in the memory, and upon execution by the at least one processor, cause the computing system to perform operations in accordance with any of the previous example embodiments.

In a fourth example embodiment, a system may include various means for carrying out each of the operations of any of the previous example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9 is a flow chart, in accordance with example embodiments.

DETAILED DESCRIPTION

Figure 1:
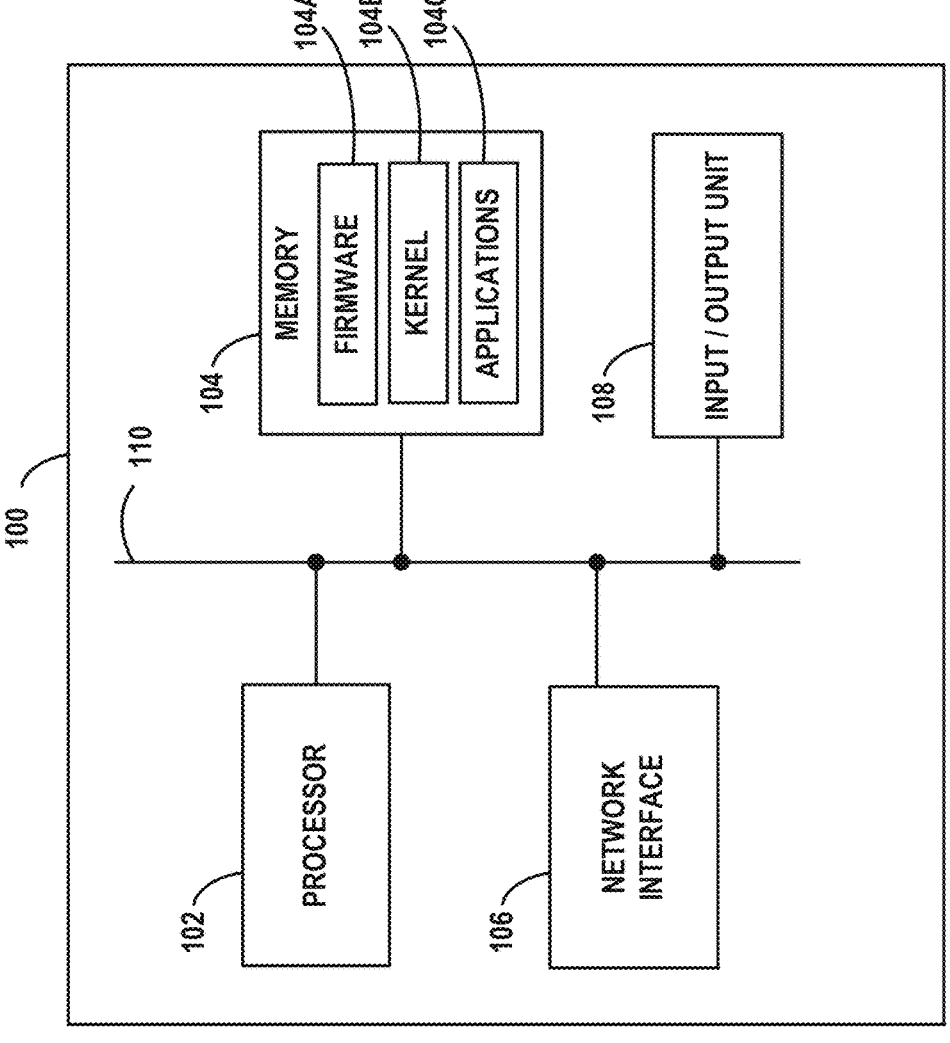
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Unless clearly indicated otherwise herein, the term "or" is to be interpreted as the inclusive disjunction. For example, the phrase "A, B, or C" is true if any one or more of the arguments A, B, C are true, and is only false if all of A, B, and C are false.

I. Example Technical Improvements

These embodiments provide a technical solution to a technical problem. One technical problem being solved is how to reduce load on database nodes in a computational instance including application nodes that frequently access data in the database nodes, and/or where this data is to be synchronized across the application nodes. In practice, this is problematic because computational instances cannot scale up by increasing the number of application nodes without adding more database nodes to service the load generated by the application nodes.

In other techniques, either more database nodes are added to the computational instance, or the frequency of communication between application nodes and database nodes is artificially limited. However, these techniques add complexity and reduce utility, as placing more database nodes in a computational instance increases the management overhead of the system, while reducing the frequency of communication can result in the application nodes losing synchronization with one another. Thus, existing techniques did little if anything to address the underlying technical problem.

The embodiments herein overcome these limitations by facilitating node-to-node communication between application nodes. In this manner, traffic to database nodes can be reduced without sacrificing synchronization robustness. This results in several advantages. First, a single application node can share information that it writes to or reads from the database nodes with all other application nodes, resulting in at least an order of magnitude less database accesses in many computational instances. Second, the node-to-node communication is lightweight and reliable (e.g., avoiding complex and computationally intensive cluster discovery and leader election features found in current solutions), having a negligible impact on the application nodes. Third, numerous application-level use cases can be efficiently deployed using node-to-node communication, with cache replication being just one.

Other technical improvements may also flow from these embodiments, and other technical problems may be solved. Thus, this statement of technical improvements is not limiting and instead constitutes examples of advantages that can be realized from the embodiments.

II. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM), IT service management (ITSM), IT operations management (ITOM), and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) has been introduced to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets and/or web components for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVAR byte-code) that a client device can use to directly generate graphical output therefrom. Other possibilities exist, including but not limited to metadata-based encodings of web components, and various uses of JAVASCRIPT® Object Notation (JSON) and/or extensible Markup Language (XML) to represent various aspects of a GUI.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

III. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a graphical processing unit (GPU), another form of co-processor (e.g., a mathematics or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, 10 Gigabit Ethernet, Ethernet over fiber, and so on). Network interface 106 may also support communication over one or more non-Ethernet media, such as coaxial cables or power lines, or over wide-area media, such as Synchronous Optical Networking (SONET), Data Over Cable Service Interface Specification (DOCSIS), or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
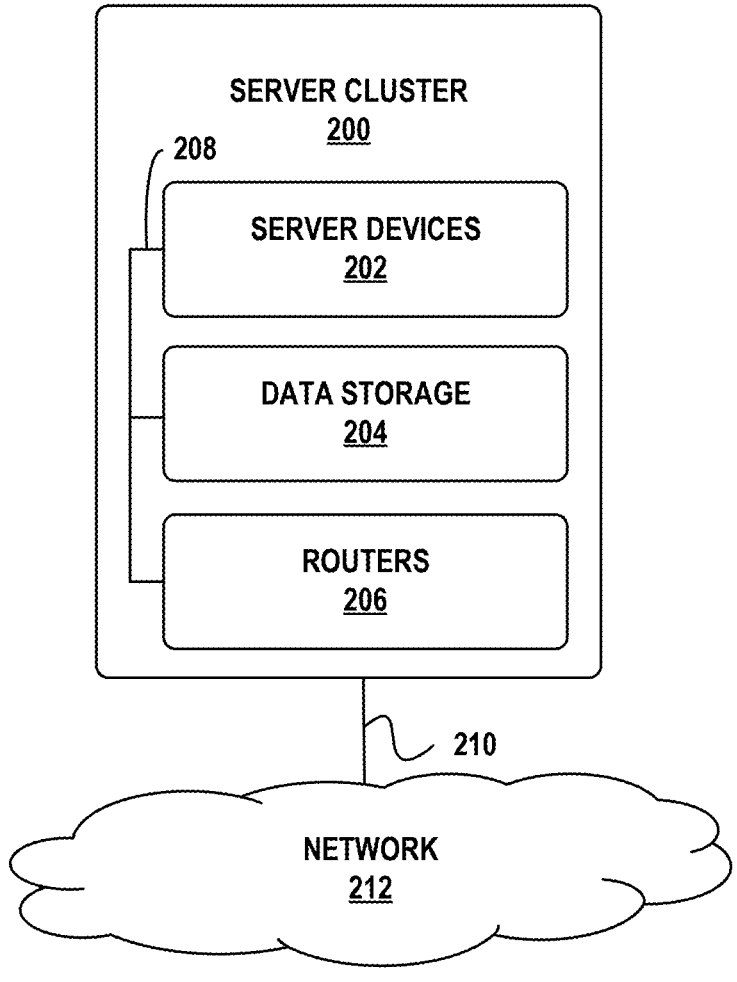
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database or a No-SQL database (e.g., MongoDB). Various types of data structures may store the information in such a database, including but not limited to files, tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, XML, JSON, or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

IV. Example Remote Network Management Architecture

Figure 3:
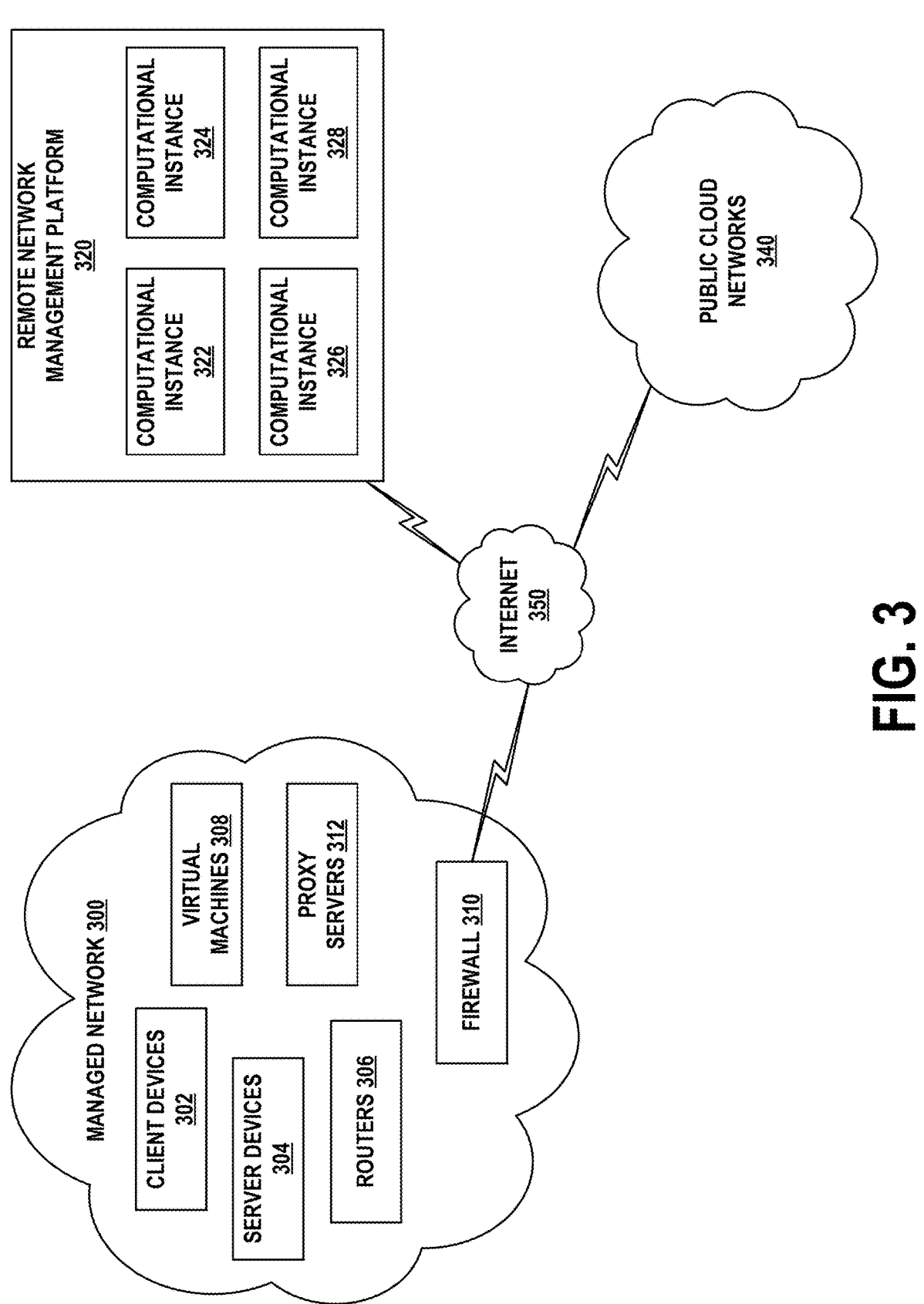
FIG. 3 depicts a remote network management architecture, in accordance with example embodiments.

FIG. 3 depicts a remote network management architecture, in accordance with example embodiments. This architecture includes three main components-managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
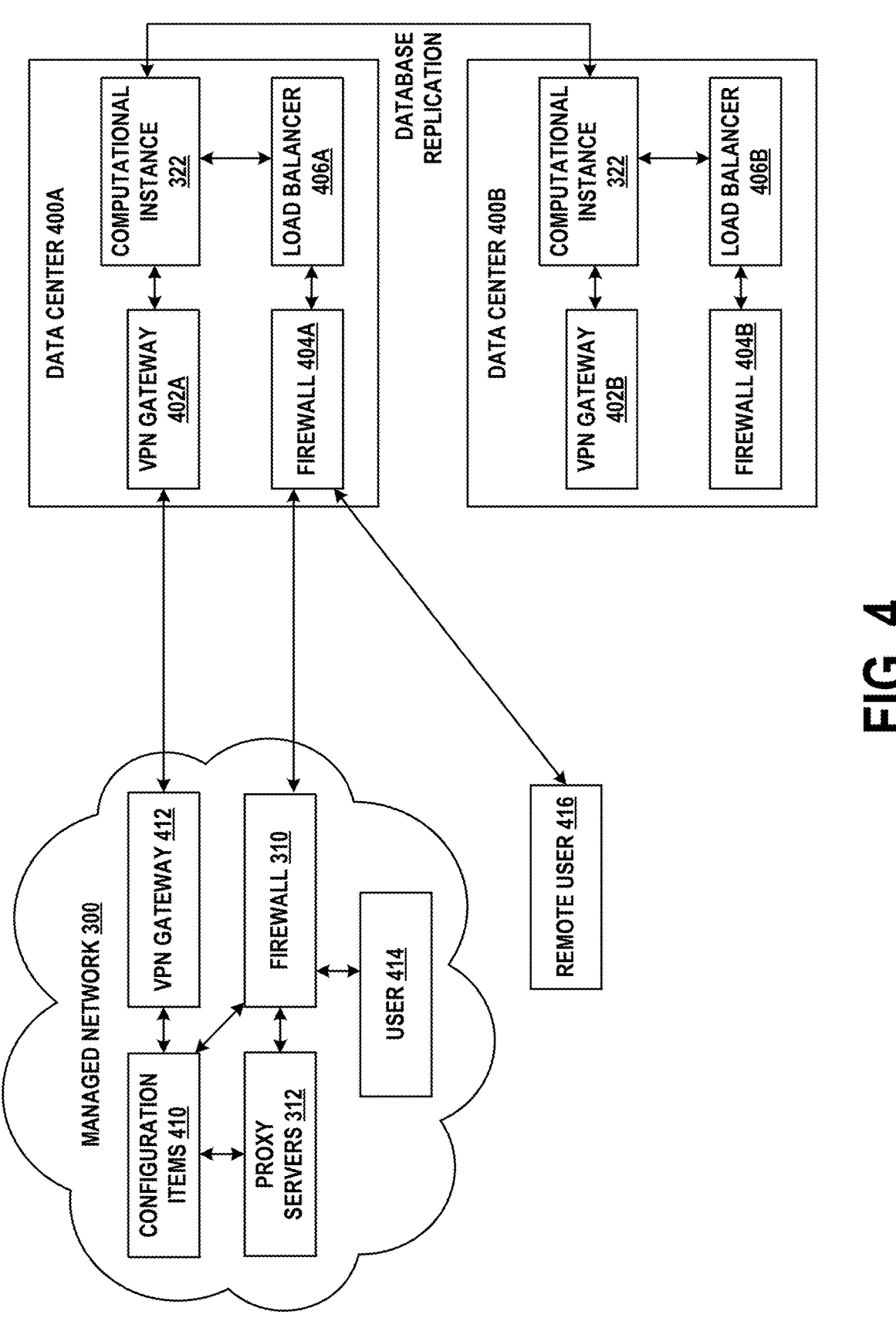
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

V. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of these devices, components, applications, and services may be referred to as configuration items.

The process of determining the configuration items and relationships therebetween within managed network 300 is referred to as discovery, and may be facilitated at least in part by proxy servers 312. To that point, proxy servers 312 may relay discovery requests and responses between managed network 300 and remote network management platform 320.

Configuration items and relationships may be stored in a CMDB and/or other locations. Further, configuration items may be of various classes that define their constituent attributes and that exhibit an inheritance structure not unlike object-oriented software modules. For instance, a configuration item class of "server" may inherit all attributes from a configuration item class of "hardware" and also include further server-specific attributes. Likewise, a configuration item class of "LINUX® server" may inherit all attributes from the configuration item class of "server" and also include further LINUX®-specific attributes. Additionally, configuration items may represent other components, such as services, data center infrastructure, software licenses, units of source code, configuration files, and documents.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
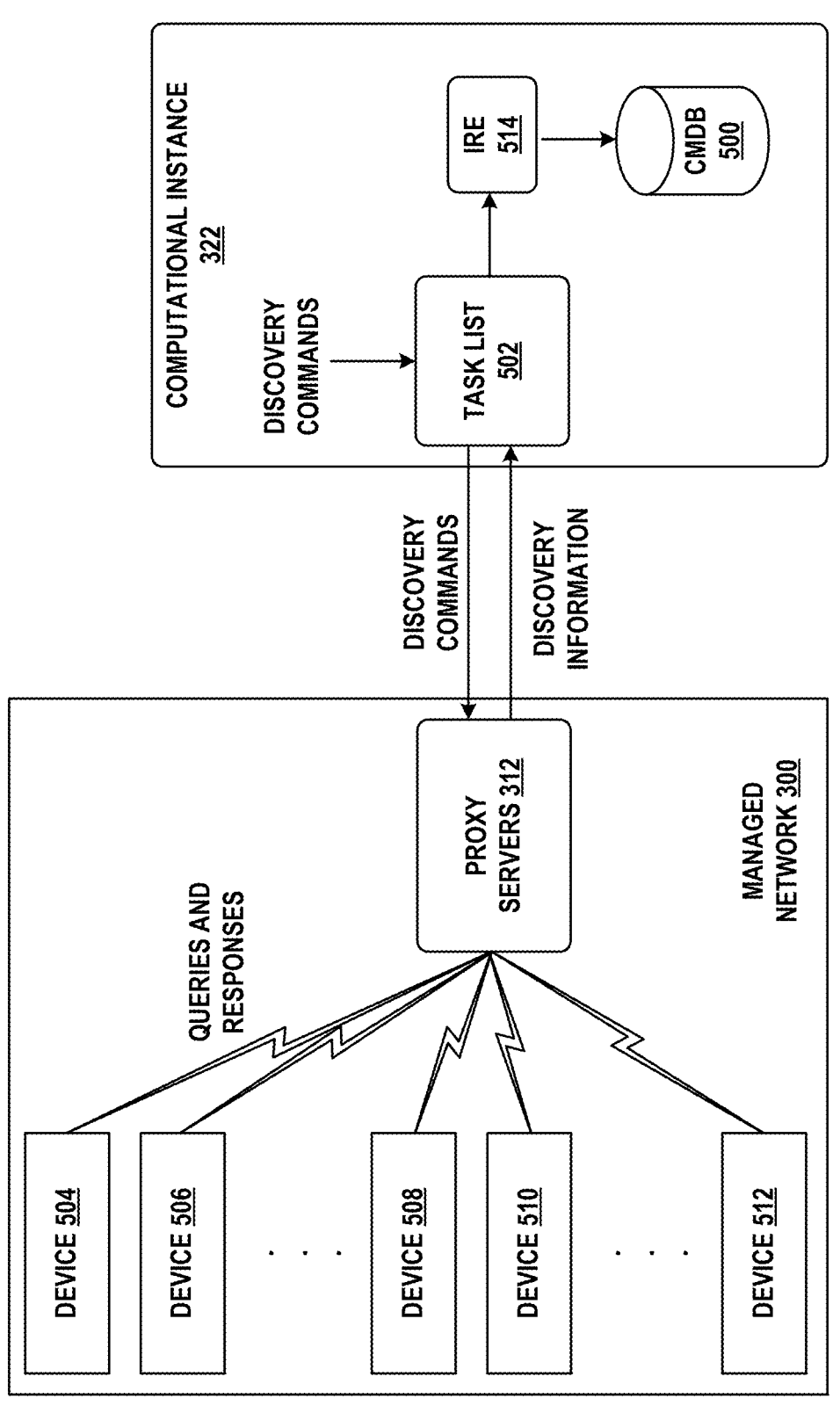
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

VI. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VII. Node-to-Node Communication for Application Nodes

A computational instance of remote network management platform 320 (e.g., computational instance 322) may include one or more application nodes and one or more database nodes. Each of these nodes could be operated by one or more computational devices and/or one or more virtual machines.

The database nodes can host one or more databases, each structured according to their respective schemas. The application nodes may be configured for processing user requests, executing application logic, rendering user interfaces, and managing communications with the database nodes. Typically, the computational instance includes a greater number of application nodes compared to database nodes, and the computational load (e.g., the user requests) is distributed across these application nodes in a balanced manner.

The database nodes may be synchronized with one another by various forms of database replication techniques. Thus, each database node may contain a copy of common, shared databases that serve as a source of truth for the computational instance. Accordingly, each database node may update the other database nodes when a local copy of any of its databases changes. On the other hand, application nodes may be spun up (placed in service) or spun down (removed from service) based on demand, a predetermined schedule, or some other criteria.

The application nodes may operate in a data-driven fashion. Thus, as an application node spins up or receives a user request, it may query a database node for information relevant to its initialization or to respond to the request, respectively. Based on the principle of locality of reference, if one application node queries specific information in a database node, then it is likely that other application nodes will also query that same information (spatial locality) and/or do so in the near future (temporal locality). Based on this principle and other patterns of data reference, the database nodes in large computational instances (e.g., with 50 or more application nodes) may serve over 5000 database accesses per second.

Each database request is computationally expensive for a database node to process. For example, the database node may parse the request, identify a database that the request specifies, identify a table within that database, determine whether a row is to be added, edited or deleted, perform this operation, and then provide a response to the request. Additional commands may create, modify, or delete database tables. For example, SQL commands that can be used to carry out these functions may include (but are not limited to) CREATE TABLE, ALTER TABLE, DROP TABLE, SELECT, INSERT INTO, UPDATE, and DELETE FROM. Nonetheless, non-SQL database technologies with different sets of commands may be used. Further, each of these accesses may require having to retrieve and join data across multiple tables from the database to create the cache entries at the application nodes. This processing of the data is a computationally expensive task.

On the other hand, distributing this information between application nodes is comparatively inexpensive, as a lightweight protocol can be used to transport the information from one application node to the others with little computational overhead on the sender or the recipients (e.g., minimal serializing, deserializing, and parsing). Accordingly, it is advantageous to replace at least some database node transactions with node-to-node communication between application nodes, as doing so reduces load on the database nodes without a significant impact on the application nodes.

A. Example Architectures

Figure 6A:
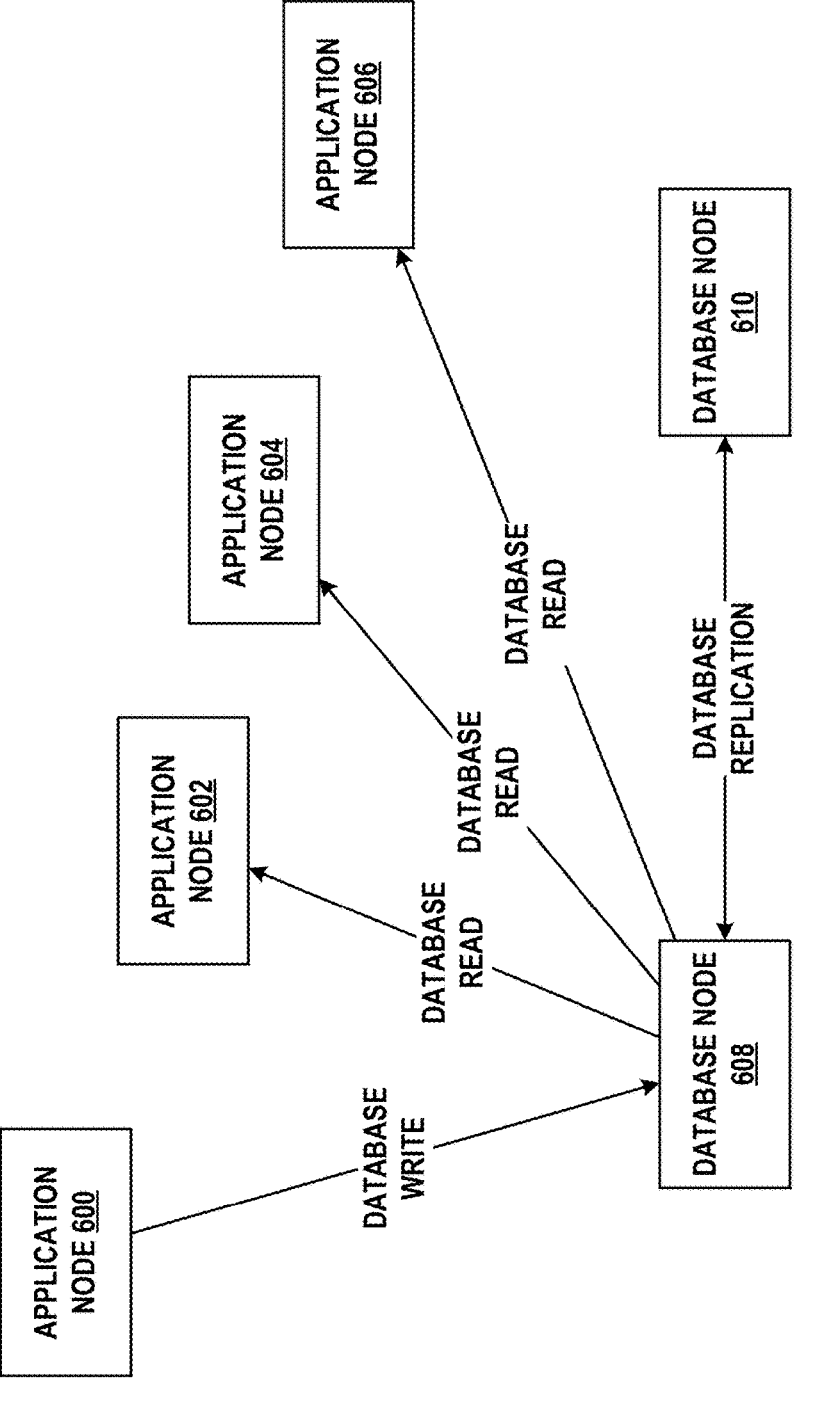
FIG. 6A depicts an arrangement of application and database nodes, in accordance with example embodiments.

In accordance with this discussion, FIG. 6A provides an example architecture for computational instance 322. This architecture includes application nodes 600, 602, 604, and 606, as well as database nodes 608 and 610. In FIG. 6A, application node 600 is shown writing to database node 608. This operation may involve, for example, modifying one or more rows of a database table. Database node 608 may synchronize this modification with database node 610 so that both of the database nodes have local copies of the same database structure.

In conventional environments, if any of application nodes 602, 604, or 606 need to access the information, they obtain their own copies of this information by individually reading it from the database. Therefore, FIG. 6A shows each of application nodes 602, 604, and 606 performing a database read. In this example, there are a total of four database accesses, one write and three reads. In possible implementations, application node 600 writes the information to a synchronization table configured in the database nodes, and all application nodes poll that table to retrieve one or more rows, optionally filtering out the rows that are not relevant to the polling application node. But these implementations may require or benefit from a polling interval of less than 100 milliseconds to efficiently maintain synchronization between application nodes. Such a short interval results in a significant load on the database nodes.

Figure 6B:
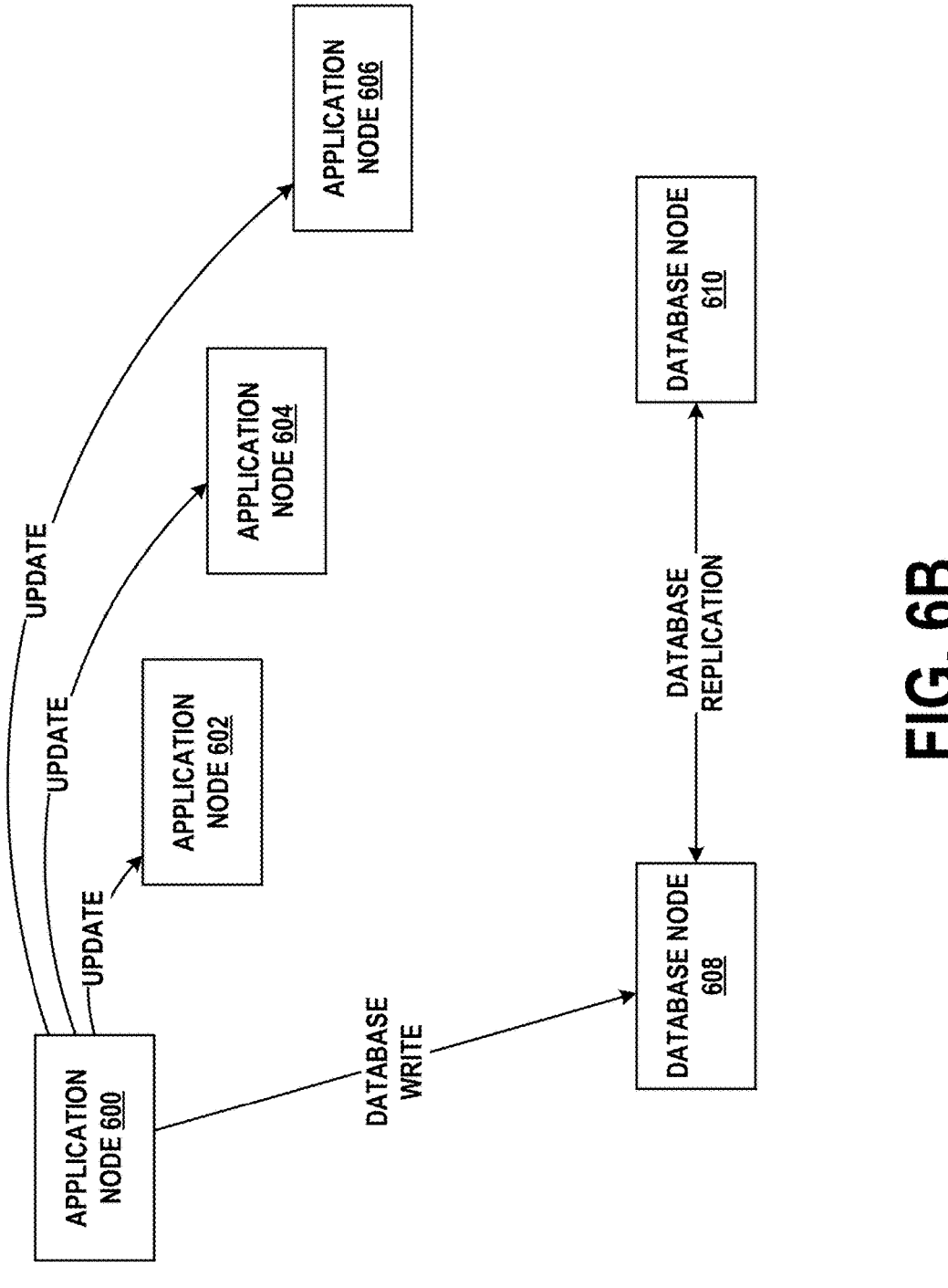
FIG. 6B depicts direct node-to-node communication between application nodes, in accordance with example embodiments.

As noted previously, the embodiments herein reduce the volume of database node accesses by enabling node-to-node communication for application nodes. FIG. 6B provides an example of this given the same architecture for computational instance 322 and the same type of transaction. Notably, application node 600 performs a database write to database node 608, but also transmits corresponding updates to each of application nodes 602, 604, and 606. These updates may each include some or all of the information written to database node 608. These updates may be transmitted proactively to application nodes 602, 604, and 606 under the reasonable assumption that application nodes 602, 604, and 606 may also need the information written to database node 608. The updates may be transmitted before, during, or after the database write to database node 608. In some cases, the database write to database node 608 can be omitted and only node-to-node communication used.

Alternatively, and as discussed below, the updates may cause application nodes 602, 604, and 606 to flush (e.g., delete) local copies of the data written to the database that are determined to be old or stale with respect to the updates. Then, the local copies are repopulated when any one of the application nodes reads the data from the database and shares it with the other application nodes.

In this manner, the volume of database accesses is reduced. Notably, the example shown in FIG. 6B replaces three computationally expensive database reads with three comparatively inexpensive update transactions. Thus, all application nodes attain local copies of the information written to the database nodes, but with 75% fewer database accesses. Consequently, polling of certain tables of the database nodes by the application nodes can be eliminated or at least the polling frequency of the application nodes can be decreased. In either case, load on the database nodes is reduced.

Although not shown in FIG. 6B, node-to-node communication may take place between each pair of application nodes. Thus, bidirectional or pairs of unidirectional communication channels may exist between application node 600 and each of application nodes 602, 604, and 606, between application node 602 and each of application nodes 604 and 606, and between application node 604 and application node 606.

In some embodiments of computational instance 322, it may be undesirable for there to be direct node-to-node communications. Such transactions may be considered risky from a security perspective.

As an alternative, node-to-node communication may take place indirectly, for instance through a load balancer. As noted above, a computational instance may employ a load balancer to distribute incoming traffic (e.g., user requests) among application nodes. Doing so may prevent any one application node from being overloaded with traffic when the other application nodes within the computational instance have spare capacity. These load balancers may be already deployed with a computational instance, and security concerns relating to network traffic between load balancers and application nodes have been addressed. Therefore, load balancers can be used safely for routing traffic between application nodes.

Figure 6C:
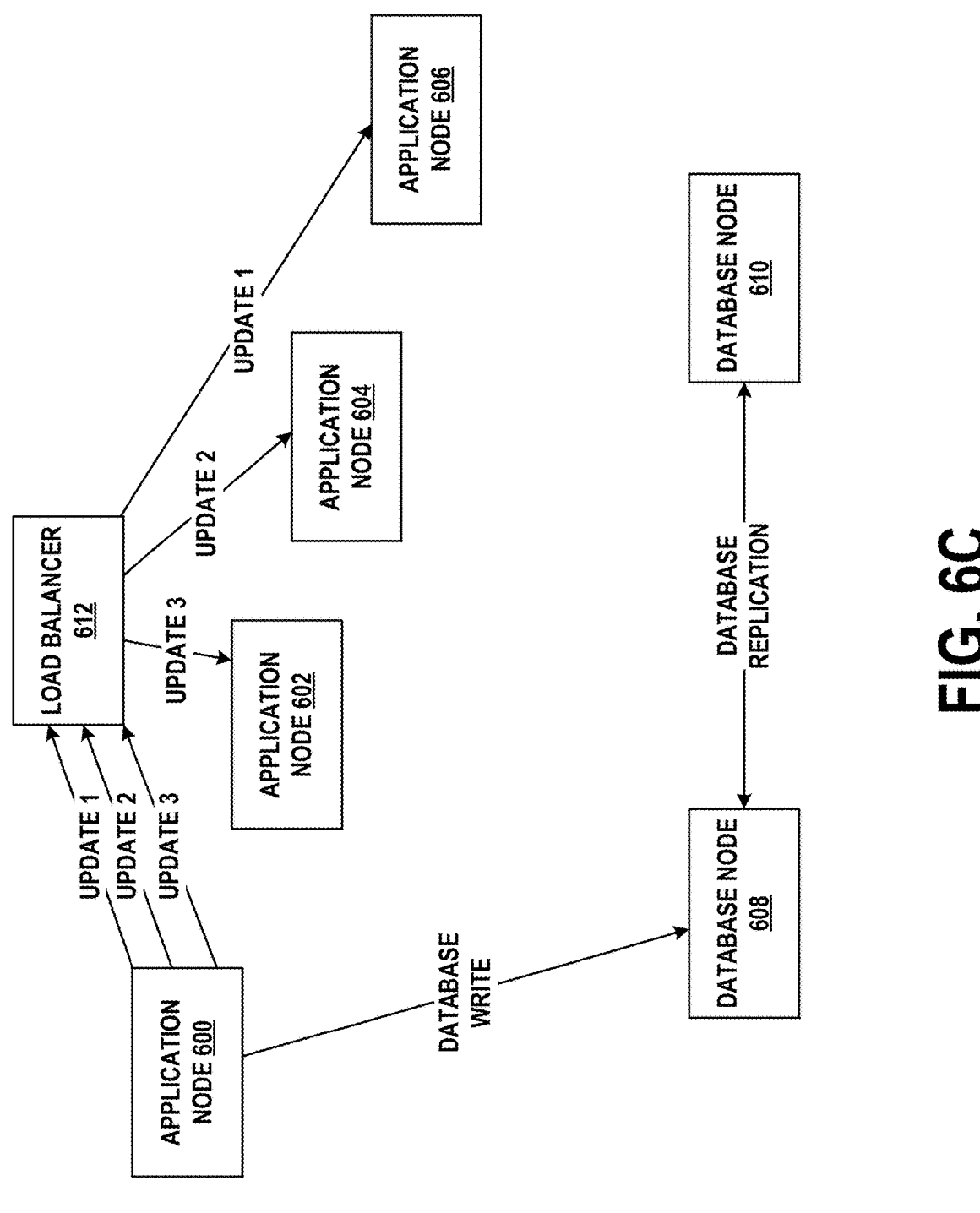
FIG. 6C depicts indirect node-to-node communications between application nodes, in accordance with example embodiments.

FIG. 6C depicts an alternative architecture for node-to-node communication from that of FIG. 6B. In FIG. 6C, load balancer 612 receives the updates from application node 600 and distributes them to application nodes 602, 604, and 606. Any traffic from application nodes 602, 604, and 606 back to application node 600 is also routed by way of load balancer 612. In another possible arrangement, load balancer 612 receives individual updates from application node 600 for each of application nodes 602, 604, and 606, and distributes them to application nodes 602, 604, and 606 respectively (i.e., if there are n−1 destination application nodes, application node 600 transmits n−1 messages by way of load balancer 612. As in the case of FIG. 6B, a database write can be omitted and only node-to-node communication used in at least some situations.

In order to maintain persistent connections between each pair of application nodes, however, sticky cookies may be employed. Here, a sticky cookie refers to a session persistence mechanism used by load balancer 612 to ensure that a sending application node's messages are directed to the same receiving application node throughout the session between these nodes. This type of cookie is a small piece of data stored on the sending application node that contains information identifying the receiving application node handling the session. When a sending application node initiates a session, it identifies a specific receiving application node in a sticky cookie. The load balancer reads the sticky cookie and routes the initiation request to the designated receiving application node.

In subsequent messages (e.g., the updates of FIG. 6C), the sending application node sends the cookie to load balancer 612. Load balancer 612 reads the sticky cookie to identify the receiving application node, and then routes the message to the receiving application node, maintaining session continuity. In the case of a WebSocket or other type of persistent connection between application nodes (see below), the sticky cookie can be omitted from subsequent node-to-node communication and only used to initially establish the connection through load balancer 612. This means that load balancer 612 may be used for load balancing of incoming traffic (e.g., the user requests discussed above) but node-to-node communication is not necessarily balanced because each node-to-node communication has a specific recipient node. Instead load balancer 612 is used as a communication intermediary for node-to-node communication.

An example of a sticky cookie in JSON format is shown below. This example is for illustrative purposes and not meant to be limiting. Notably, other structured text formats, such as XML, could be used to represent sticky cookies.

```
{
    "cookieName": "MyCookie",
    "value": "abc123xyz",
    "destination": "appnode1234.example.com",
    "secure": true,
    "httpOnly": true,
    "maxAge": 3600
}
```

This sticky cookie includes several parameters that define its behavior and scope. The cookieName is the identifier for the cookie, such as "MyCookie", which is used by both the sending and receiving application nodes to differentiate the sticky cookie from other sticky cookies. The value parameter stores the data within the sticky cookie, for instance, "abc123xyz", which may be a session identifier or other session information. The destination parameter specifies the domain (or alternatively, an IP address) of the receiving application node, such as "appnode1234.example.com". The secure parameter indicates whether the sticky cookie should only be transmitted over secure protocols like HTTPS, enhancing security by protecting the sticky cookie from interception during transmission. The httpOnly parameter specifies that the sticky cookie is accessible only through HTTP(S) and not available to client-side scripts, which increases security by preventing JavaScript or other client-side software from accessing the sticky cookie. The maxAge parameter specifies the maximum age of the sticky cookie in seconds, such as 3600, determining how long (e.g., in seconds) the sticky cookie will be retained before it expires. Nonetheless, other sticky cookie parameters and associated behaviors may be possible.

In another alternative, a load balancer may be implemented as part of an application delivery controller (ADC). The embodiments herein may bypass the load balancing function of the ADC by using the sticky cookie, and still take advantage of other ADC features, such as secure communication (e.g., by way of TLS) and proxy functions for application node traffic.

Regardless of whether the direct node-to-node architecture of FIG. 6B or the indirect node-to-node architecture of FIG. 6C is employed, these architectures support node-to-node communication for more than just database writes. Such communication may also be triggered by reads, deletions, or other modifications to a database within a database node (e.g., creation, reading, modification, or deletion of any database, database table, or row within a database table). Also, application nodes 600, 602, 604, and 606, may be simultaneously processing user requests and providing responses thereto that are not shown explicitly in FIG. 6A, 6B, or 6C. In the case of FIG. 6C, these user requests and their corresponding responses may be routed through load balancer 612.

Moreover, while the use case discussed herein is database cache replication between application nodes (see below), the node-to-node communication could be used for more than database-related operations. It could be used, for example, to coordinate computational work across multiple application nodes or when accessing external data sources. It could also be used to communicate between user sessions connected to different application nodes.

B. Example Communication Channels and Protocols

The node-to-node communication of FIGS. 6B and 6C may take a number of forms. The application nodes may employ full-duplex communication (in which each of a pair of application nodes can simultaneously transmit information to the other) or half-duplex communication (in which only one of a pair of application nodes can transmit information to the other of the pair at any given point in time). Further, the pairs of application nodes can communicate in a point-to-point fashion or by way of multicast or broadcast. In the multicast and broadcast cases, a sending application node may transmit a message to two or more other application nodes, and these receiving application nodes may filter out messages that are not directed to them or relevant to their operation. Thus, a wide variety of communication channels and protocols can be used for either type of node-to-node communication.

As an illustrative example, WebSockets may be used in this fashion. WebSockets provide full-duplex communication channels over a single, long-lived TCP connection, enabling real-time data exchange between a pair of application nodes. Unlike traditional HTTP, where a client endpoint initiates a request and waits for a response, WebSockets allow both endpoints to send and receive messages independently and simultaneously. The communication begins with a WebSocket handshake, which starts as an HTTP request and is then upgraded to the WebSocket protocol through the use of specific HTTP headers. Once established, the connection remains open, reducing the overhead associated with establishing multiple HTTP connections. WebSockets use a standardized format to encapsulate messages, allowing for efficient and low-latency transmission of text and binary data.

As WebSockets are particularly well-suited for applications requiring real-time updates, they are a reasonable candidate for supporting node-to-node communication within a computational instance. Since WebSockets are point-to-point, each pair of application nodes may maintain one or more WebSocket connections therebetween. Nonetheless, other communication protocols may be used.

C. Example Application Node Communication Architecture

Figure 7:
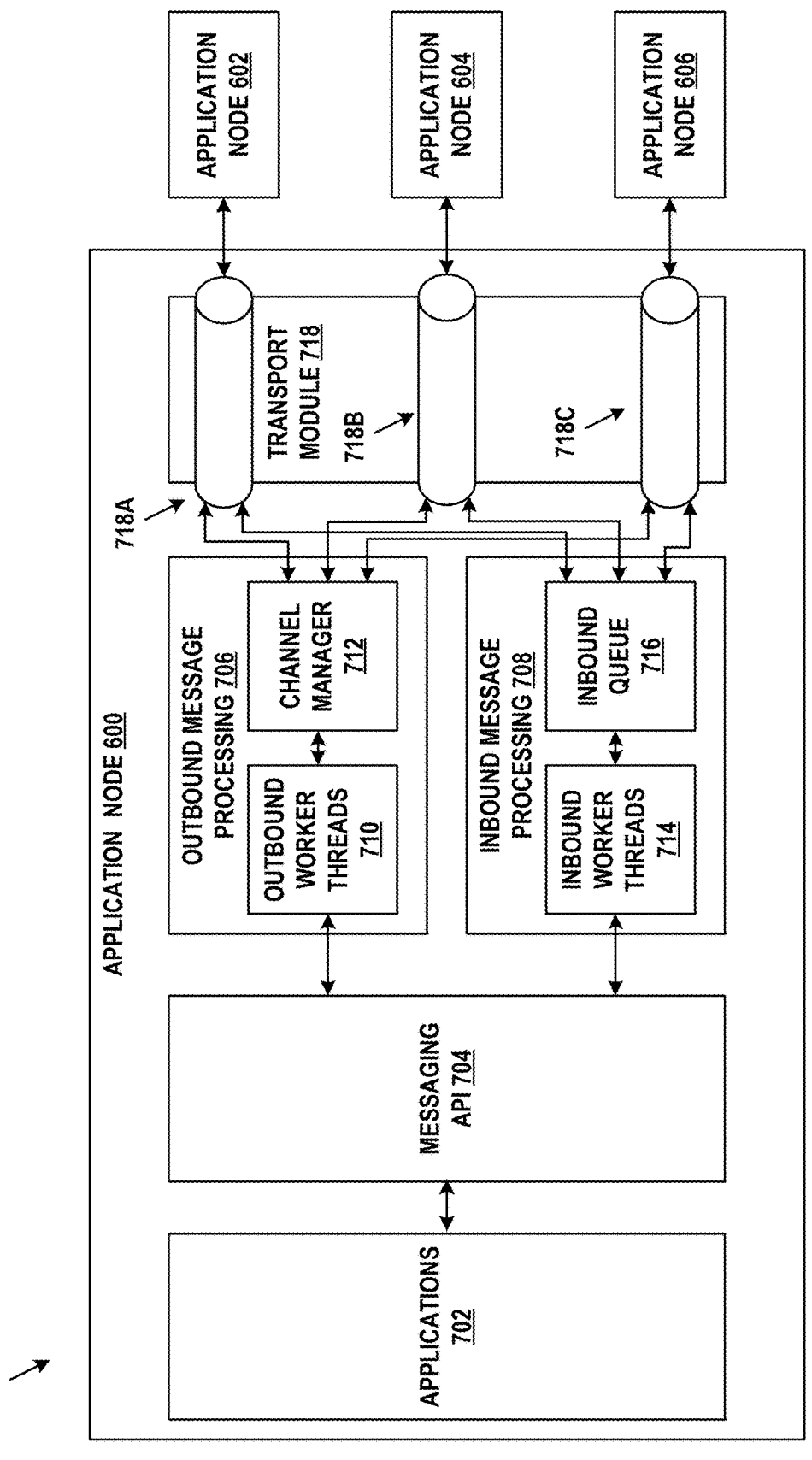
FIG. 7 depicts a communication architecture for an application node, in accordance with example embodiments.

Regardless of whether WebSockets or some other mechanism is used for communication, each application node may be modified to support node-to-node communication. FIG. 7 depicts an application node communication architecture 700 that supports the features described herein.

Communication architecture 700 depicts software included in application node 600, such as applications 702, messaging API 704, outbound message processing 706, inbound message processing 708, and transport module 718. While not explicitly shown, other application nodes, such as application nodes 602, 604, and 606, may also include their own instances of communication architecture 700.

In short, messaging API 704 provides an interface through which messages can be broadcast and received between a group of n application nodes. Outbound messages are transmitted to n−1 destination application nodes by way of respective n−1 channels, one for each destination application node. Inbound messages are received by an application node, decoded, and routed to a destination application. Channels are instantiations of a software bus between each pair of application nodes. For the purposes of this discussion, it is assumed that channels are full-duplex and support binary encoding of messages. However, as discussed above, channels can take on several different forms. Nonetheless, when a new application node is added to a computational instance, a new channel should be added between that application node and each of the existing application nodes.

Applications 702 include any application or software operational on application node 600, including those facilitating the cache replication use case described below. Applications 702 may consist of some number of threads (or processes) that interact with messaging API 704.

Messaging API 704 is a common interface through which any of applications 702 can transmit and receive messages to other application nodes. It may provide, for example, a set of function calls available to applications 702 regarding the creation and deletion of channels as well as the transmission, reception, and/or management of messages by way of these channels. In some cases, messaging API 704 may add metadata to each message, for instance identifying its source application, source application node (application node 600), destination application nodes (application nodes 602, 604, and 606), and possibly other information. Alternatively, such metadata may be added by applications 702 or outbound message processing 706.

Outbound message processing 706 handles messages to be transmitted on behalf of applications 702. Outbound message processing 706 may include outbound worker threads 710 and channel manager 712. In response to receiving a message from one of applications 702, outbound message processing 706 may spawn a set of send-message tasks, one for each channel defined by channel manager 712. Outbound worker threads 710 execute these tasks on the message by supplying a copy of the message to each of the channels in transport module 718. Notably, there may be more or fewer outbound worker threads 710 than channels.

Transport module 718 may include the channels (e.g., WebSockets). In the example of FIG. 7, channel 718A is between application nodes 600 and 602, channel 718B is between application nodes 600 and 604, and channel 718C is between application nodes 600 and 606. Each of these channels is configured to deliver messages to their respective destination application nodes in a reliable fashion. If a channel does not support concurrent writes from outbound worker threads 710, transport module 718 may include a channel locking function to provide exclusive write access to a channel for each of outbound worker threads 710. When an outbound worker thread 710 completes writing to a channel, the outbound worker threads 710 may release the lock so that other outbound worker threads 710 can write to the channel.

Inbound message processing 708 handles messages to be received by applications 702. Inbound message processing 708 may include inbound worker threads 714 and inbound queue 716. When a message arrives at one of the channels of transport module 718, it is routed to inbound queue 716. Inbound queue 716 may temporarily store messages until they can be processed by inbound worker threads 714. Inbound queue may be implemented as a first-in-first-out (FIFO) queue, or some form of priority queue in which some messages are processed out of order of reception or faster than others. Regardless, one of inbound worker threads 714 may remove a message from inbound queue 716, optionally remove any metadata from the message, and route it to one of applications 702. The destination application may be determined based on it being identified in the metadata. Alternatively, the destination application may remove the metadata. Notably, there may be a pool of inbound worker threads 714 to add parallelization to the operations of inbound message processing 708.

The embodiments of FIG. 7 represent just one implementation of node-to-node communication within an application node. Other implementations are possible, some of which may have different features and functions, and/or the features and functions of FIG. 7 may be distributed in different ways.

D. Example Cache Replication Use Case

Figure 8:
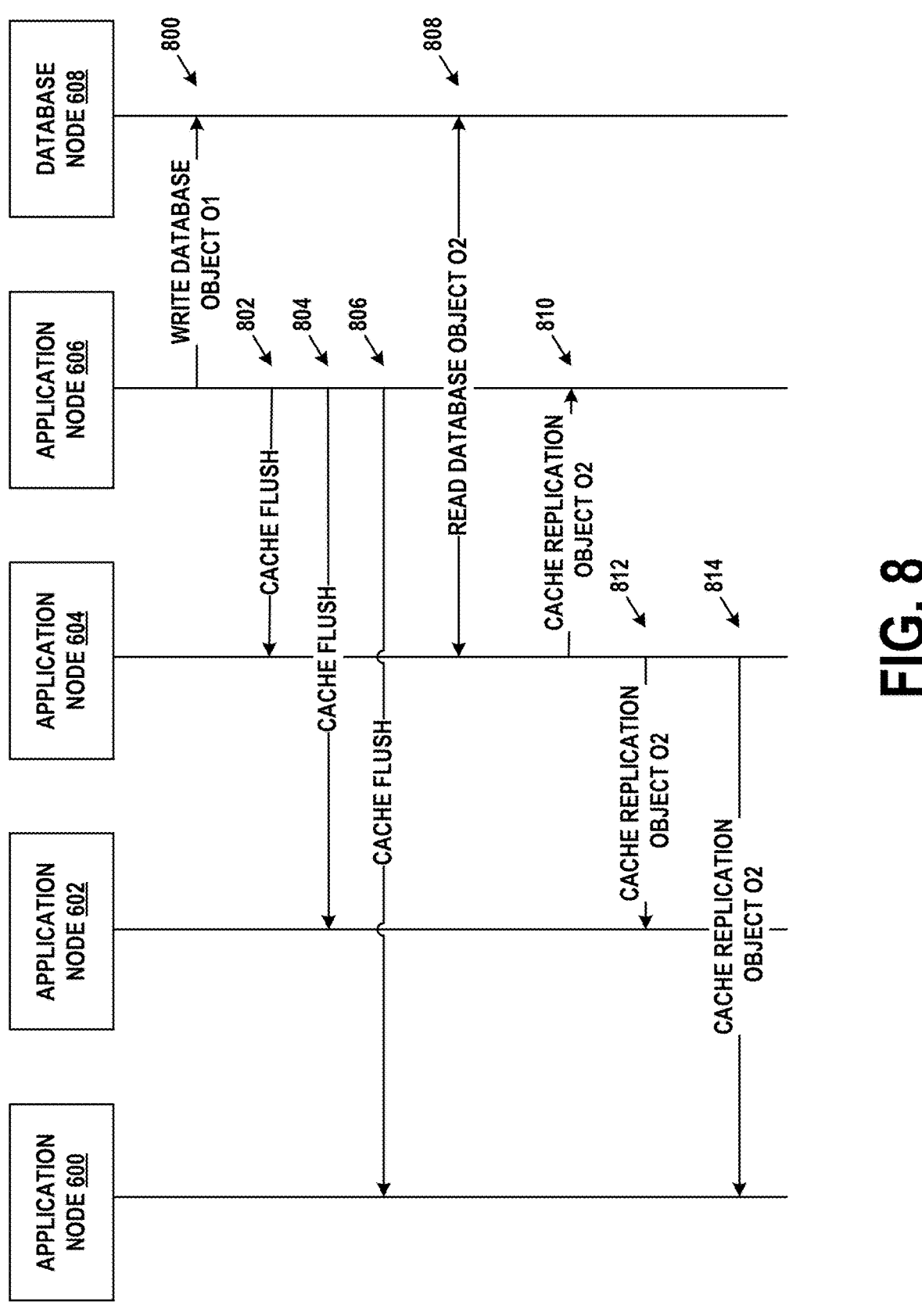
FIG. 8 depicts node-to-node communication in a cache replication use case, in accordance with example embodiments.

FIG. 8 depicts a cache replication use case that employs the node-to-node communication described herein. FIG. 8 provides an example embodiment using application nodes 600, 602, 604, and 606, as well as database node 608. However, different numbers of application nodes and database nodes may be involved.

In this use case, each application node temporarily stores data retrieved from the database nodes, thereby reducing load on the database nodes and improving access speed for frequently requested data. The replicated data may be from any database or table supported by the database nodes. For sake of simplicity, it is assumed herein that the database nodes have one or more dedicated cached tables that store the information to be replicated between the application nodes. But other arrangements are possible.

Cache replication procedures may be triggered when data is written to a cache table of a database node by one of the application nodes. Doing so may cause the same data to be transmitted to the other application nodes by the writing application node (as shown in FIGS. 6A, 6B, and 6C) and/or a cache flush message being transmitted to the other application nodes by the writing application node (as shown in FIG. 8). The cache flush message instructs the other application nodes to either empty their versions of the cache completely or to remove one or more particular units of information from their versions of the cache (e.g., rows or a table or tables of a database).

Cache replication procedures may also be triggered when data is read from a cache table by one of the application nodes and stored at this application node. This data is then provided to the other application nodes via node-to-node communication to maintain uniformity across the application nodes. Based on the principle of locality of reference, if one application node reads the data, then other application nodes are also likely to read the data within a short period of time.

FIG. 8 illustrates an example of cache replication procedures. At step 800, application node 606 writes database object O1 to database node 608. Database object O1 may be one or more rows of a table, one or more tables of a database, or some other object. In response, at steps 802, 804, and 806, application node 606 transmits cache flush messages by way of node-to-node communication to application nodes 604, 602, and 600, respectively. After receiving the cache flush messages, these nodes may remove database object O1 from their caches or empty their caches completely.

At step 808, which may take place at some point after steps 802, 804, and 806, application node 604 reads database object O2 from database node 608. Database object O2 may be the same as or different from database object O1. In response, at steps 810, 812, and 814, application node 604 transmits cache replication messages way of node-to-node communication to application nodes 606, 602, and 600, respectively. After receiving the cache replication messages, these nodes may add database object O2 to their caches.

To handle potential conflicts, this cache replication mechanism may include conflict resolution strategies, such as last-write-wins (LWW). In a system employing LWW, each database object write operation is accompanied by a timestamp indicating the time that the database object was written. The database object as written, along with its timestamp, is then propagated to other application nodes as part of the node-to-node replication process. Each application node stores the database object and its associated timestamp. Then, when an application node receives a cache replication message relating to the same object from another application node, it may compare the timestamp of the incoming message with the timestamp of the existing database object that it stores. If the incoming message's timestamp is more recent, the application node updates its stored version of the database object to this newer version. If the incoming message's timestamp is older, the stored version remains unchanged. Nonetheless, other conflict resolution strategies may be employed.

VIII. Example Operations

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve conducting, by an application node, an operation with a database node, wherein the application node and the database node are both within a computational instance of nodes.

Block 902 may involve transmitting, by the application node and to each of a plurality of destination application nodes, a message relating to the operation, wherein the plurality of destination application nodes are also within the computational instance of nodes.

Block 904 may involve updating, by each of the plurality of destination application nodes, respective local storage of data relating to the operation. This node-to-node communication and maintaining of local storage facilitates a reduction in accesses of the database node. Consequently, computationally expensive database accesses are replaced by comparatively inexpensive node-to-node messaging that allows the overall system to operate more efficiently and scale up with fewer database nodes.

In some implementations, the operation is a read of the data from the database node, and wherein the message contains a representation of the data.

In some implementations, reception of the message containing the representation of the data causes the plurality of destination application nodes to use their respective local storage of the data for a period of time rather than read the data from the database node.

In some implementations, the operation is a write of the data to the database node, and wherein the message contains a flush instruction.

In some implementations, reception of the message containing the flush instruction causes the plurality of destination application nodes to delete their respective local storage of the data.

In some implementations, the operation is a write of the data to the database node, and wherein the message contains a representation of the data.

In some implementations, reception of the message containing the representation of the data causes the plurality of destination application nodes to use their respective local storage of the data for a period of time rather than read the data from the database node.

In some implementations, the application node is in communication with each of the plurality of destination application nodes by way of respective Web Sockets connections.

In some implementations, transmitting the message relating to the operation comprises: transmitting, by the application node and to a load balancer, respective copies of the message for each of the plurality of destination application nodes; and transmitting, by the load balancer and to each of the plurality of destination application nodes, the respective copies of the message.

In some implementations, the application node comprises: one or more applications; a messaging interface through which the one or more applications can communicate with the plurality of destination application nodes; a transport module including channels between the application node and each of the plurality of destination application nodes; and an outbound message processing module including outbound worker threads that route messages from the messaging interface to the plurality of destination application nodes.

In some implementations, the application node also comprises an inbound message processing module including inbound worker threads that route messages from the plurality of destination application nodes to the one or more applications.

In some implementations, the application node and the plurality of destination application nodes also communicate with one another by way of a cache stored in the database node that maintains information that is synchronized between the application node and the plurality of destination application nodes.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of non-transitory computer readable medium such as a storage device including RAM, ROM, a disk drive, a solid-state drive, or another tangible storage medium.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
conducting, by an application node, a write operation of data to a database of a database node, wherein the application node, a plurality of destination application nodes, and the database node are all within a computational instance of nodes;
transmitting, by the application node and to each of the plurality of destination application nodes, respective messages indicating the write operation and the data; and
updating, by each of the plurality of destination application nodes, respective local storages with the data, wherein reception of the respective messages indicating the write operation and the data causes the plurality of destination application nodes to use the respective local storages of the data for a period of time rather than read the data from the database node.

2. The method of claim 1, wherein the application node is in communication with each of the plurality of destination application nodes by way of respective WebSockets connections.

3. The method of claim 1, wherein transmitting the respective messages indicating the write operation and the data comprises:
transmitting, by the application node and to a load balancer, respective copies of the respective messages for each of the plurality of destination application nodes; and
transmitting, by the load balancer and to each of the plurality of destination application nodes, the respective copies of the respective messages.

4. The method of claim 1, wherein the application node comprises:
one or more applications;
a messaging interface through which the one or more applications can communicate with the plurality of destination application nodes;
a transport module including channels between the application node and each of the plurality of destination application nodes; and
an outbound message processing module including outbound worker threads that route messages from the messaging interface to the plurality of destination application nodes.

5. The method of claim 4, wherein the application node also comprises:
an inbound message processing module including inbound worker threads that route messages from the plurality of destination application nodes to the one or more applications.

6. The method of claim 1, wherein the application node and the plurality of destination application nodes also communicate with one another by way of a cache stored in the database node that maintains information that is synchronized between the application node and the plurality of destination application nodes.

7. The method claim 1, further comprising:
conducting, by the application node, a further write operation of further data to the database;
transmitting, by the application node and to each of the plurality of destination application nodes, respective further messages indicating a cache flush operation relating to the further data; and
updating, by each of the plurality of destination application nodes, the respective local storages to remove copies of the further data.

8. A non-transitory computer-readable medium, having stored thereon program instructions that, upon execution by a computing system, cause the computing system to perform steps comprising:
conducting, by an application node, a write operation of data to a database of a database node, wherein the application node, a plurality of destination application nodes, and the database node are all within a computational instance of nodes;
transmitting, by the application node and to each of the plurality of destination application nodes, respective messages indicating the write operation and the data; and
updating, by each of the plurality of destination application nodes, respective local storages with the data, wherein reception of the respective messages indicating the write operation and the data causes the plurality of destination application nodes to use the respective local storages of the data for a period of time rather than read the data from the database node.

9. The non-transitory computer-readable medium of claim 8, wherein transmitting the respective messages indicating the write operation and the data comprises:

transmitting, by the application node and to a load balancer, respective copies of the respective messages for each of the plurality of destination application nodes; and transmitting, by the load balancer and to each of the plurality of destination application nodes, the respective copies of the respective messages.

10. The non-transitory computer-readable medium of claim 8, wherein the application node comprises:

one or more applications;

a messaging interface through which the one or more applications can communicate with the plurality of destination application nodes;

a transport module including channels between the application node and each of the plurality of destination application nodes; and an outbound message processing module including outbound worker threads that route messages from the messaging interface to the plurality of destination application nodes.

11. The non-transitory computer-readable medium of claim 10, wherein the application node also comprises:

an inbound message processing module including inbound worker threads that route messages from the plurality of destination application nodes to the one or more applications.

12. The non-transitory computer-readable medium of claim 8, wherein the application node and the plurality of destination application nodes also communicate with one another by way of a cache stored in the database node that maintains information that is synchronized between the application node and the plurality of destination application nodes.

13. The non-transitory computer-readable medium of claim 8, wherein the steps further comprise:

conducting, by the application node, a further write operation of further data to the database;

transmitting, by the application node and to each of the plurality of destination application nodes, respective further messages indicating a cache flush operation relating to the further data; and updating, by each of the plurality of destination application nodes, the respective local storages to remove copies of the further data.

14. The non-transitory computer-readable medium of claim 8, wherein the application node is in communication with each of the plurality of destination application nodes by way of respective WebSockets connections.

15. The non-transitory computer-readable medium of claim 9, wherein the respective copies of the respective messages comprise a sticky cookie.

16. A method comprising:

conducting, by an application node, a read operation of data from a database of a database node, wherein the application node, a plurality of destination application nodes, and the database node are all within a computational instance of nodes;

transmitting, by the application node and to each of the plurality of destination application nodes, respective messages indicating the read operation and the data; and updating, by each of the plurality of destination application nodes, respective local storages with the data, wherein reception of the respective messages indicating the read operation and the data causes the plurality of destination application nodes to use the respective local storages of the data for a period of time rather than read the data from the database node.

17. The method of claim 16, wherein the application node is in communication with each of the plurality of destination application nodes by way of respective WebSockets connections.

18. The method of claim 16, wherein transmitting the respective messages indicating the read operation and the data comprises:

transmitting, by the application node and to a load balancer, respective copies of the respective messages for each of the plurality of destination application nodes; and transmitting, by the load balancer and to each of the plurality of destination application nodes, the respective copies of the respective messages.

19. The method of claim 16, wherein the application node comprises:

one or more applications;

a messaging interface through which the one or more applications can communicate with the plurality of destination application nodes;

a transport module including channels between the application node and each of the plurality of destination application nodes; and an outbound message processing module including outbound worker threads that route messages from the messaging interface to the plurality of destination application nodes.

20. The method of claim 19, wherein the application node also comprises:

an inbound message processing module including inbound worker threads that route messages from the plurality of destination application nodes to the one or more applications.

\* \* \* \* \*